M. POOLE.
TRACK-CLEARER.
No. 188,178. Patented March 6, 1877.
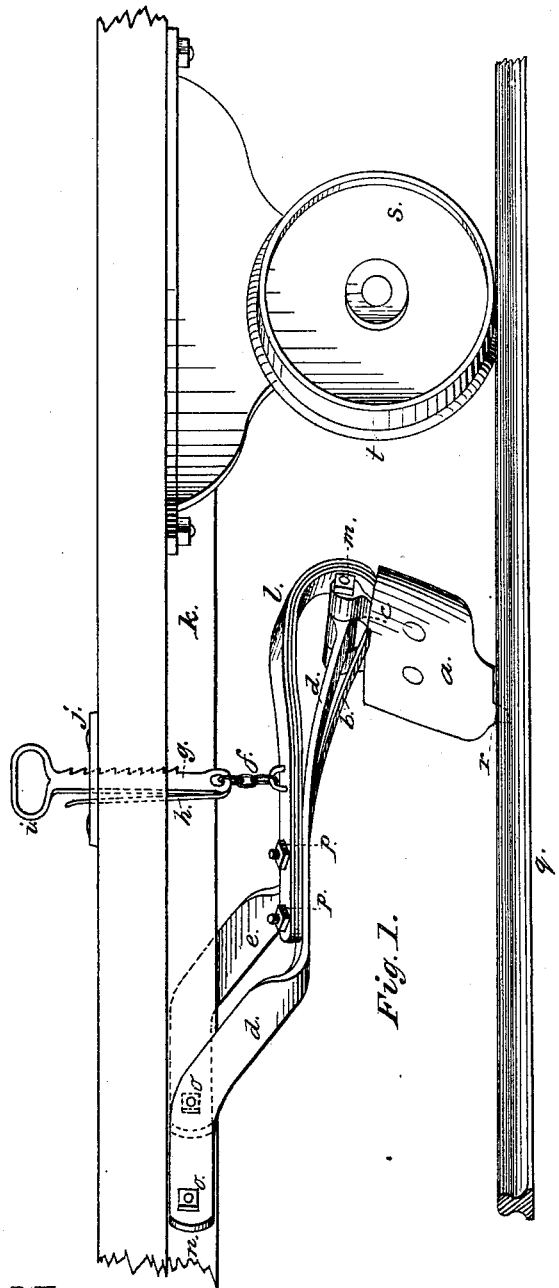
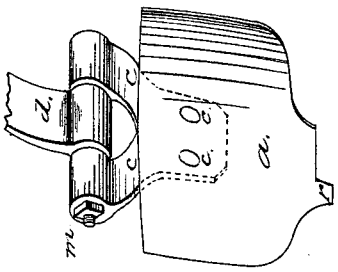
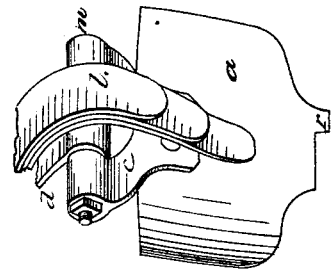
Witnesses:
G. J. Marriott
Thos Hughes
Inventor:
Middleton Poole

UNITED STATES PATENT OFFICE.

MIDDLETON POOLE, OF COLUMBUS, OHIO, ASSIGNOR OF ONE-HALF HIS RIGHT TO WILLIAM McCRORY, OF SAME PLACE.

IMPROVEMENT IN TRACK-CLEARERS.

Specification forming part of Letters Patent No. 188,178, dated March 6, 1877; application filed January 10, 1877.

*To all whom it may concern:*

Be it known that I, MIDDLETON POOLE, of Columbus, in the county of Franklin and State of Ohio, have invented a new and useful Improvement in a Self-Adjusting Flange and Track-Cleaner for Street-Railroads, which improvement is fully set forth in the following specification and drawing.

The object of my invention is to furnish a machine for clearing the track of street railroads from snow, ice, mud, dirt, stone, or ground, or anything that may impede the speed of the car.

This machine is self-adjusting when let down on the track, and cleans the track both on the top, on the inside of the rail where the flange of the car-wheels run, throwing any impediments which may be on the rails either way, so as to leave the track perfectly clear and unobstructed for the wheels.

In the drawing, Figure 1 is a perspective view of the flange and track-cleaner in its working position. No. 2 shows a rear view of the shovel and rear end of spring and the upright to which the shovel is attached. No. 3 shows a front view of the shovel, upright, and the knuckle-joint, showing the manner of the attachment of the shovel to the upright and the attachment of the upright to the beam.

Letter $a$ in Fig. 1 gives a perspective view of the shovel in its working position. Letter $r$ shows the point of the shovel extending below for the purpose of cleaning the inside of the rail for the flange of the wheel. Letter $b$ shows a stay attached to the beam, and extends back to the shovel to keep it in position and prevent it from going forward. Letter $c$ shows the upright, with the shovel attached to it. Letter $d$ shows the rear end of the beam to which the upright is attached. Letter $m$ represents the knuckle-joint or hinge of the upright to the beam. Letter $l$ represents the spring, consisting of leaves, with its attachment to the beam at $p\,p$, with two bolts, and its manner of acting upon the shovel. Letter $d$ shows the left beam; $e$, the right beam, with its attachment to the center sill of the car, and $d$ to the left or outside sill of the car. Letters $o\,o$ represent the attachment of the two beams to the sills of the car. Letter $n$ represents the left sill and $k$ the middle sill of the car. Letter $f$ represents the chain attached to the beam and to the rack $g$. Letter $g$ represents the rack, and $i$ the handle of the same, which is used for the purpose of lifting or raising up the track-cleaner from the rail. Letter $j$ represents the catch for holding the rack up in position when raised. Letter $h$ represents a spring which presses or throws the rack onto the catch. Letter $q$ represents the rail, with the track-cleaner in position. Letter $t$ shows the flange of the wheel on the inside of the rail, and $s$ the car-wheel.

It will be seen in Fig. 1 that the shovel, in its position on the track, is so attached to the beam above by the upright, with its knuckle-joint, that when it comes in contact with anything which it cannot remove from the rail, the point moves backward and the whole track-cleaner rises up and passes over the object, and is thrown in place by the spring in the rear.

This track-cleaner is attached to the fore part of the sills of the car, immediately in front of the two front wheels on each side.

Having thus described my invention, what I claim as new, and desire to secure by Letters Patent, is—

1. The hinged shovel or plow $a$, with spring $l$, stay $b$, and beams $d\,e$, in combination with the adjusting-rack $g$, and handle $i$, arranged substantially as shown and described.

2. A snow-plow or shovel, $a$, provided with point $r$ and hinge-joint $m$, in combination with a spring, $l$, stay $b$, and beams $d\,e$, all arranged as shown and specified.

3. The snow-cleaner herein described, consisting of the shovel or plow $a$, provided with knuckle-joint $m$, the spring $l$, beams $d\,e$, stay $b$, adjusting-rack $g$, and handle $i$, all constructed and arranged, substantially as shown and described.

MIDDLETON POOLE.

Witnesses:
G. J. MARRIOTT,
ADAM SCHNEIDER.